(12) United States Patent
Khanna et al.

(10) Patent No.: US 7,881,197 B2
(45) Date of Patent: Feb. 1, 2011

(54) INTERFACE SCHEDULING AND TRAFFIC-SHAPING

(75) Inventors: Bakul Khanna, Lexington, MA (US); Leigh McLellan, Framingham, MA (US); Robert Lee, Lexington, MA (US); Dale Nash, Sudbury, MA (US)

(73) Assignee: Avaya Inc., Basking Ridge, NJ (US)

( * ) Notice: Subject to any disclaimer, the term of this patent is extended or adjusted under 35 U.S.C. 154(b) by 955 days.

(21) Appl. No.: 11/315,894

(22) Filed: Dec. 22, 2005

(65) Prior Publication Data

US 2007/0147403 A1 Jun. 28, 2007

(51) Int. Cl.
- G01R 31/08 (2006.01)
- G06F 11/00 (2006.01)
- G08C 15/00 (2006.01)
- H04J 1/16 (2006.01)
- H04J 3/14 (2006.01)
- H04J 1/00 (2006.01)
- H04L 12/26 (2006.01)
- H04L 12/28 (2006.01)
- H04L 12/56 (2006.01)

(52) U.S. Cl. .................... 370/235; 370/414
(58) Field of Classification Search ............... 370/235.1
See application file for complete search history.

(56) References Cited

U.S. PATENT DOCUMENTS

| | | | |
|---|---|---|---|
| 6,891,835 B2 | 5/2005 | Kalkunte et al. | |
| 6,937,561 B2 | 8/2005 | Chiussi et al. | |
| 7,239,646 B1 * | 7/2007 | Sindhu et al. | 370/461 |
| 7,304,945 B1 * | 12/2007 | Vishnu | 370/230 |
| 2003/0026287 A1 * | 2/2003 | Mullendore et al. | 370/442 |
| 2003/0081624 A1 | 5/2003 | Aggarwal et al. | |
| 2003/0231593 A1 | 12/2003 | Bauman et al. | |
| 2004/0085982 A1 | 5/2004 | Choi | |
| 2004/0114602 A1 | 6/2004 | Ko et al. | |
| 2004/0208123 A1 | 10/2004 | Sakata et al. | |
| 2004/0215811 A1 | 10/2004 | Bar et al. | |
| 2005/0005021 A1 | 1/2005 | Grant et al. | |
| 2005/0249232 A1 | 11/2005 | Balint | |

* cited by examiner

*Primary Examiner*—Daniel J Ryman
*Assistant Examiner*—Christopher Crutchfield
(74) *Attorney, Agent, or Firm*—Chapin IP Law, LLC; David W. Rouille, Esq.

(57) ABSTRACT

Efficient interface scheduling that maintains fairness among the scheduled interfaces and remains efficient even when scheduling large numbers of interfaces and even when implemented in software. Systems for scheduling interfaces through a physical port are provided that utilize a bit-mask. Each bit-mask has a bit-mask-level-1 having a plurality of bits, each bit in the bit-mask-level-1 represents a unit of bandwidth with the total number of bits in the bit-mask-level-1 representing the port's line speed, each bit in a bit-mask-level-1 is associated with an interface, and the number of bits associated with each interface determines the bandwidth for that interface. Methods of scheduling interfaces are provided that utilize one or more bit-masks to determine an order in which interfaces are scheduled. The present invention can efficiently implement versions of the dual-token-bucket algorithm.

13 Claims, 4 Drawing Sheets

INTERFACE SCHEDULING AND TRAFFIC-SHAPING

FIELD OF THE INVENTION

The present invention relates generally to communication networks. More particularly, the present invention relates to scheduling and controlling the traffic through a large number of interfaces.

BACKGROUND OF THE INVENTION

Communication networks are used to transport vast amounts of information. As more and more information is carried over these communication networks, the various communication devices (that is, network nodes), such as routers and switches, are called upon to process still increasing amounts of data traffic. Often times, the data traffic includes data having different bandwidth requirements. The data traffic may also have different priority levels. On the output side of a communication device, memory buffers are used to store data units when traffic bursts cause data units to be received at a communication device at a faster rate than they can be processed. The various communication devices within a communication network must schedule data transmissions for the data units based upon, among other things, the relative bandwidth requirements of the data. Many traffic control techniques have been developed in conjunction with memory buffers to schedule data units for transmission. Data units may be portions of packets, frames, cells, or other units of data.

Communication links between network nodes in packet-based communications networks are often referred to as "interfaces." An interface can be a physical entity (for example, a port or a switch or router) or a logical entity (for example, a channel in a packet over a SONET (POS) link, a VC, or a VLAN). An example of when many channels, VCs, or VLANs run over a single physical circuit can be found in packet or cell switching, in which packets from many sources are multiplexed and transmitted from endpoint to endpoint over a switched network.

Typical output traffic control implementations have included one or more queues per interface to buffer output traffic. In many products, such queues are built into hardware for efficiency. However, newer and more advanced communication devices may be called on to handle thousands of interfaces, wherein different interfaces may support different traffic types and may have different bandwidth requirements. Hardware required to support each interface combination in a communication device is inflexible with respect to the number or queues, enqueue properties, and dequeue properties, for example. Accordingly, each hardware implementation is typically custom designed for that interface combination. Custom designing hardware for each particular interface combination is a costly and time consuming task.

Software-based queuing provides much more flexibility. However, the standard methods of interface scheduling and traffic control in software do not scale up well (that is, do not perform well) for large numbers of interfaces, especially on high-speed lines. Accordingly, there is a need in the art for efficient software-based interface scheduling for large numbers of interfaces.

SUMMARY OF THE INVENTION

The present invention provides for interface scheduling that maintains fairness among the scheduled interfaces and remains efficient even when scheduling large numbers of interfaces and even when implemented in software. Systems useful for scheduling interfaces through a physical port are provided that utilize a bit-mask. Each bit-mask comprises a bit-mask-level-1 having a plurality of bits, each bit in the bit-mask-level-1 represents a unit of bandwidth with the total number of bits in the bit-mask-level-1 representing the port's line speed. Each bit in a bit-mask-level-1 is associated with an interface and each interface is associated with one or more bits in the bit-mask-level-1. The number of bits associated with each interface determines the bandwidth for that interface. Bit-masks of the present invention may have multiple levels. Each bit in an upper-level of a bit-mask is associated with a lower-level bit-mask-segment. Methods of scheduling interfaces are provided that utilize one or more bit-masks to determine an order in which interfaces are scheduled. The present invention can efficiently implement versions of the dual-token-bucket algorithm. Additional advantages of the present invention may become apparent to one of ordinary skill in the art upon the reading and understanding of the descriptions provided herein.

In one aspect the present invention embodies a system for scheduling interfaces, comprising: a physical port having a line speed; a plurality of interfaces associated with the port, each interface having a bandwidth; and a bit-mask comprising a bit-mask-level-1 having a plurality of bits, each bit in the bit-mask-level-1 representing a unit of bandwidth with the total number of bits in the bit-mask-level-1 representing the port's line speed, each bit in the bit-mask-level-1 associated with an interface, each interface associated with one or more bits in the bit-mask-level-1 with the number of bits associated with each interface determining the bandwidth for that interface. In a second aspect, the present invention embodies systems comprising a multi-level bit-mask. Bits in upper levels of a bit-mask are associated with bit-mask-segments of lower levels. In a third aspect, the present invention embodies systems comprising multiple bit-masks.

In a fourth aspect, the present invention embodies a method of scheduling interfaces, comprising: associating a bit-mask, comprising a bit-mask-level-1 having a plurality of bits, with a physical port, wherein each bit in the bit-mask-level-1 represents a unit of bandwidth with the total number of bits in the bit-mask-level-1 representing the port's line speed; associating each bit in the bit-mask-level-1 with an interface, associating each interface with one or more bits in the bit-mask-level-1, wherein the number of bits associated with each interface determines the bandwidth for that interface; and determining an order, in which interfaces are scheduled, from the bit-mask. In a fifth aspect, the present invention embodies a method for scheduling interfaces, comprising: associating a first bit-mask and a second bit-mask with a physical port, each bit-mask comprises a bit-mask-level-1, wherein each bit in each bit-mask-level-1 represents a unit of bandwidth with the total number of bits in each bit-mask-level-1 representing the port's line speed; associating each bit in each bit-mask-level-1 with an interface, wherein the number of bits in each bit-mask-level-1 associated with an interface determines a bandwidth for that interface; and determining an order, in which interfaces are scheduled, from the first bit-mask and the second bit-mask. In a sixth aspect, the present invention embodies a method for Traffic Shaping and comprises associating a first bit-mask with committed information rates for the interfaces and associating a second bit-mask with excess information rates for the interfaces.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DETAILED DESCRIPTION OF THE INVENTION

Figure 1:
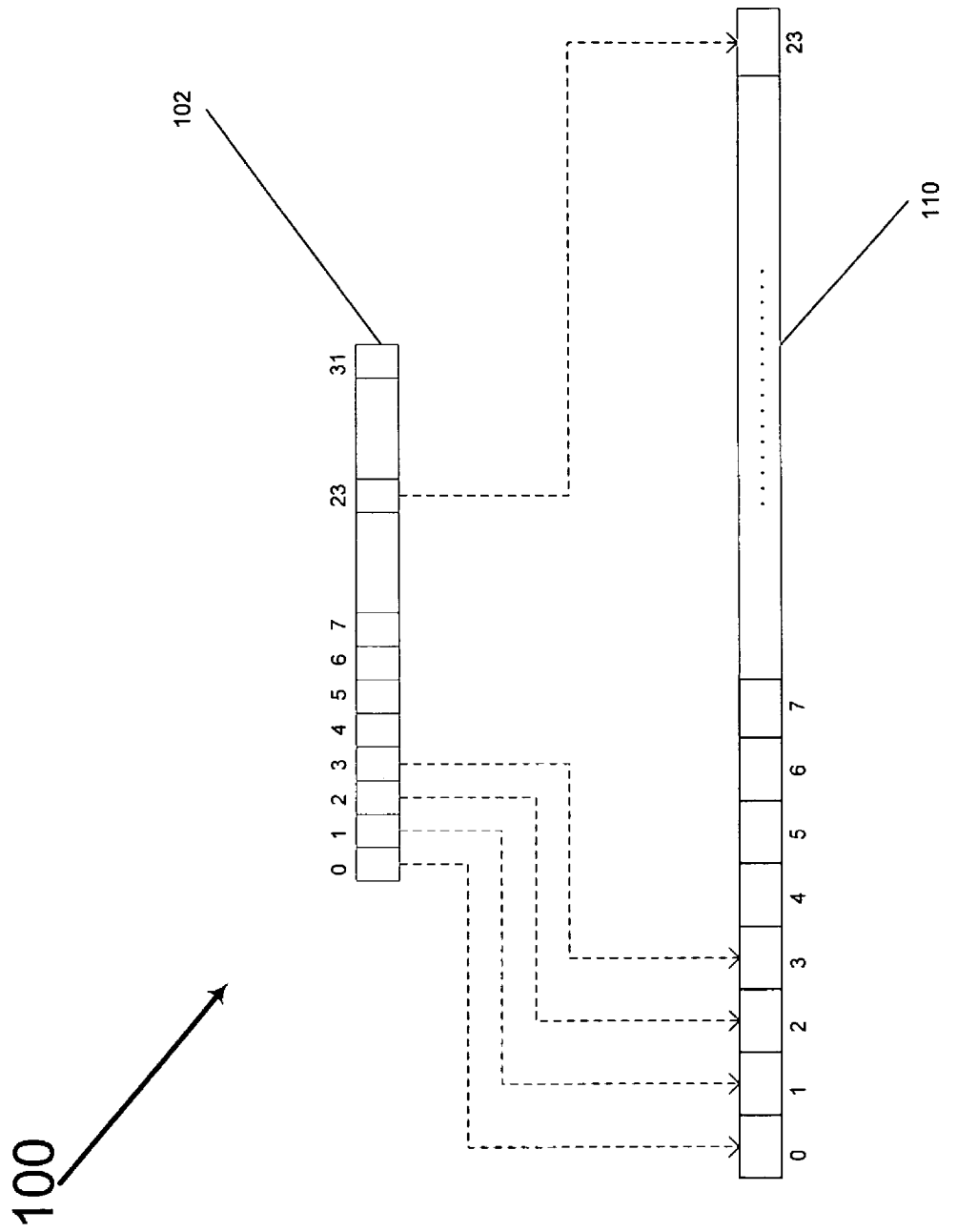
FIG. 1 illustrates an embodiment of the present invention comprising a bit-mask-array and a single-word bit-mask.

The present invention provides for interface scheduling that maintains fairness among the scheduled interfaces and remains efficient even when scheduling large numbers of interfaces and even when implemented in software. Each physical port, through which an interface may transmit data units, may have many interfaces associated with it. Each interface may comprise a single queue or each interface may comprise a plurality of queues. Efficient interface scheduling is enabled by the creation and use of one or more bit-masks for each physical port.

Each bit-mask includes a bit-mask-level-1 having a plurality of bits. Each bit in a bit-mask-level-1 represents the smallest unit of bandwidth for the physical port's line-speed. The total number of bits in a bit-mask-level-1, collectively represent the line-speed of the physical port. For example, if the line-speed of the physical port is a 1.536 Mbps (that is, a DS1 line) with the lowest VC speed of 64 kbps, then the lowest unit of bandwidth that each bit represents is 64 kbps and the total number of bits in the bit-mask-level-1 is 1.536 Mbps/64 kbps=24. If the line-speed of the physical port is DS3 (the equivalent of 28 DS1 or 672 DS0), then the bit-mask-level-1 will contain 672 bits. If the line-speed of the physical port is OC3 (the equivalent of 100 DS1 or 2400 DS0), the bit-mask-level-1 will contain 2400 bits.

Each bit in a bit-mask-level-1 is associated with an interface and each interface on the physical port is represented by one or more bits in the bit-mask-level-1. Thus, each interface has one or more bits in the bit-mask-level-1 associated with it. The number of bits in the bit-mask-level-1 associated with each interface determines the bandwidth for that interface. For example, in the examples above, the unit of bandwidth associated with each bit is 64 kbps. Accordingly, an interface having a single bit in the bit-mask-level-1 will have a bandwidth of 64 kbps. An interface having two bits associated with it in the bit-mask-level-1 will have a bandwidth of 128 kbps. An interface having three bits associated with it in the bit-mask-level-1 will have a bandwidth of 192 kbps, and so on. The relative spacing of these bits in the bit mask dictate the frequency of servicing that interface.

Embodiments of the present invention comprise operable logic adapted to perform scheduling-related methods of the present invention (also referred to herein as "scheduling logic"). That is, the scheduling logic executes the methods of the present invention. The scheduling logic of the present invention can be implemented as a set of computer program instructions that are stored in a computer-readable medium and executed by an embedded microprocessor system within the scheduler. Embodiments of the invention may be implemented, in whole or in part, in any conventional computer programming language. For example, preferred embodiments may be implemented in a procedural programming language (for example, "C") or an object oriented programming language (for example, "C++"). Although the present invention is considered software-based, alternative embodiments of the invention may be implemented, in whole or in part, utilizing discrete components, integrated circuitry, programmable logic used in conjunction with a programmable logic device such as a Field Programmable Gate Array (FPGA) or microprocessor, or any other means including any combination thereof. Additional embodiments of the invention may be implemented, in whole or in part, as a computer program product for use with a computer system. Such implementation may include a series of computer instructions fixed either on a tangible medium, such as a computer-readable media (for example, a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (for example, shrink wrapped software), preloaded with a computer system (for example, on system ROM or fixed disk), or distributed from a server or electronic bulletin board over a network (for example, the Internet or World Wide Web).

The present invention as described herein may refer to numerous associations and correspondences. For example, in the description of the present invention bits in bit-masks are associated with or correspond to an interface. Additionally, an interface is associated with a port if the interface's transmissions are through the port. As is known in the art of implementing logic as described above (including the art of computer programming, for example), these, and other, associations and correspondences typically manifest themselves, for example, either as programming data structures (either separate from or embedded in the logic) to keep track of the associations and correspondences or, alternately, can manifest themselves in the procedural aspects of the logic.

Interface scheduling according to the present invention may operate on a single bit-mask or may operate on multiple bit-masks. Each bit-mask may have a single level (that is, a bit-mask-level-1 ) or may comprise multiple levels (that is, one or more bit-mask-upper-levels in addition to a bit-mask-level-1 ). When an interface has data units (for example, packets) to transmit, the bits in the bit-mask-level-1 corresponding to that interface are set. A clear bit in the bit-mask-level-1 indicates that the corresponding interface does not have any data units to transmit. Setting a bit can involve setting the value of the bit to 1 or 0 as long as clearing a bit sets it to the other value. For example, if a bit is set to 1 to indicate an interface has data units to transfer, then the bit will be cleared to 0 to indicate the corresponding interface has no data units to transmit. Conversely, if a bit is set to 0 to indicate an interface has data units to transfer, then the bit will be cleared to 1 to indicate the corresponding interface has no data units to transmit. Thus, bits in a bit-mask-level-1 corresponding to an interface are set during operation when data units are queued at the interface.

When a de-queuing function is performed at an interface, the bits in a bit-mask-level-1 corresponding to that interface are cleared if the interface becomes empty after the de-queuing function is performed. Generally, interface scheduling routines of the present invention search for the next interface to be scheduled for de-queuing. In a preferred embodiment, this search will involve starting at one end of the bit-mask-level-1 and looking sequentially at the bits until the next set bit is located. This sequential search can be executed in a single, or very few, assembly-level instructions, making it very efficient. When executing a sequential search of the bits in the bit-mask-level-1, the relative positioning of bits in the bit-mask-level-1 that represent an interface determines the frequency of servicing that interface.

Once the position of a set bit in the bit-mask-level-1 is identified, indicating the associated interface has data units to be transmitted, the next step is to locate the "interface-class identifier" associated with that interface. The interface-class identifier is located by using the position of the set bit in the bit-mask-level-1 as an index into a bit-mask-array. For example, if the set bit is in the first position in the bit-mask-level-1, then the interface-class identifier associated with that interface will be in the first position of the bit-mask-array. If the set bit is in the second position in the bit-mask-level-1, then the interface-class identifier associated with that interface will be in the second position of the bit-mask-array. Similarly, if the set bit is in the $n^{th}$ position in the bit-mask-level-1, then the interface-class identifier associated with that interface will be in the $n^{th}$ position of the bit-mask-array.

The located interface-class identifier comprises the information necessary to service the corresponding interface (that is, perform an interface de-queuing operation). Typically, the interface-class identifier will be a pointer to a data structure used by a de-queuing function or a pointer to an executable routine for performing a de-queuing function on the corresponding interface. Interfaces may comprise a single queue or may comprise a plurality of queues (having different priorities, for example). If an interface comprises a plurality of queues, then the specific queue within that interface from which to transmit data units would need to be identified. Generally, the number of queues associated with an interface is small. Accordingly, scheduling routines known in the art can be advantageously utilized to schedule data units from among a plurality of queues associated with an interface. Of course, if an interface comprises a single queue, then the interface de-queuing operation is even simpler. Interface de-queuing functions are well known in the art and one of ordinary skill in the art of programming communication devices will readily understanding how to service an interface once bit-masks of the present invention are advantageously used to identify the next interface to service and locate the interface-class identifier.

After an interface-class identifier is located, data units are de-queued from that interface. If the interface becomes empty upon performing the interface de-queuing function, then all bits in the bit-mask-level-1 corresponding to the interface are cleared. After the de-queuing function is performed, the scheduling logic of the present invention resumes looking for the next set bit in the bit-mask-level-1. De-queuing data units from an interface is also referred to herein as servicing the interface. As is known in the art of scheduling transmissions, each interface is serviced until either the interface becomes empty or the time unit for servicing a bit in the bit-mask-level-1 has expired. This interface will be serviced again when the next bit corresponding to this interface is detected, since the number of bits in the bit-mask-level-1 corresponding to an interface is proportional to the bandwidth of the interface. For example, if there are 24 bits in a bit-mask-level-1 of the present invention, then a first interface having 4 bits in the bit-mask-level-1 would be serviced twice as frequently as that of any interfaces having only 2 bits in the bit-mask-level-1. Specific amounts of time units for servicing a bit may vary between implementation and may depend on parameters such as line speed and the number of interfaces, for example.

FIG. 1 illustrates an embodiment of the present invention 100 comprising a bit-mask-level-1 102 and a bit-mask-array 110 useful for scheduling 24 interfaces. The bit-mask-level-1 102 makes up the entire bit-mask in FIG. 1. The bit-mask-level-1 102 is implemented as a single 32-bit word having 24 usable bits and 8 bits that are not used. The phrase "usable bits," unless specifically stated otherwise, is used herein to refer to the bits in a bit-mask that are used for bit-mask purposes. That is, bits 0 to 23 in the 32-bit word are considered to be in the bit-mask-level-1, and therefore, in the bit-mask, whereas bits 24 to 31 are not considered to be in the bit-mask-level-1, and therefore, not in the bit-mask. The bit-mask-level-1 102 can be implemented as an integer-type word, for example, well know in 32-bit computer architectures with 24 bits being used for bit-mask purposes (that is, 24 usable bits). The 24 bits in the bit-mask-level-1 102 are associated with the 24 elements of the bit-mask-array 110 as indicated by the dashed arrows in FIG. 1. That is, bit 0 of the bit-mask-level-1 102 is associated with element 0 of the bit-mask-array 110, bit 1 of the bit-mask-level-1 102 is associated with element 1 of the bit-mask-array 110, and so on, with bit 23 of the bit-mask-level-1 102 associated with element 23 of the bit-mask-array 110. Each element of the bit-mask-array 110 is associated with an interface and contains an interface-class identifier. As explained above, interface-class identifiers are typically pointers to data structures that can be advantageously used to perform a de-queuing operation on the associated interface. Alternately, interface-class identifiers might be pointers to executable routines for performing a de-queuing operation on the associated interface.

Interface scheduling according to the present invention operates on the bit-mask. That is, interface scheduling determines an order, in which interfaces are scheduled, from the bit-mask. Preferably, scheduling methods of the present invention will start at one end of the bit-mask-level-1 102 and look for the next set bit. One of ordinary skill in the art of computer programming will readily understand how to perform this step very efficiently using one or a very few assembly-level instructions. A set bit in the bit-mask-level-1 102 indicates that the corresponding interface has data units to transmit. For example, if the scheduling method starts at bit 0 and bit 3 is the first set bit, then the interfaces associated with bit 0, bit 1, and bit 2 do not need servicing. When the scheduling logic notices that bit 3 is set, the interface-class identifier in the corresponding element (that is, element 3) of the bit-mask-array 110 is used to perform an interface de-queuing function on the corresponding interface in accordance with the interface's bandwidth. After the de-queuing function is finished, the scheduling logic checks to see if the interface is empty. If the interface is empty, the scheduling logic clears all the bits in the bit-mask-level-1 102 corresponding to the empty interface. Next, the interface logic resumes looking for the next set bit, starting at bit 4. When all the bits in the bit-mask-level-1 102 have been checked, and the appropriate interfaces serviced, the queue scheduling can begin again at the first bit (that is, bit 0).

Figure 2:
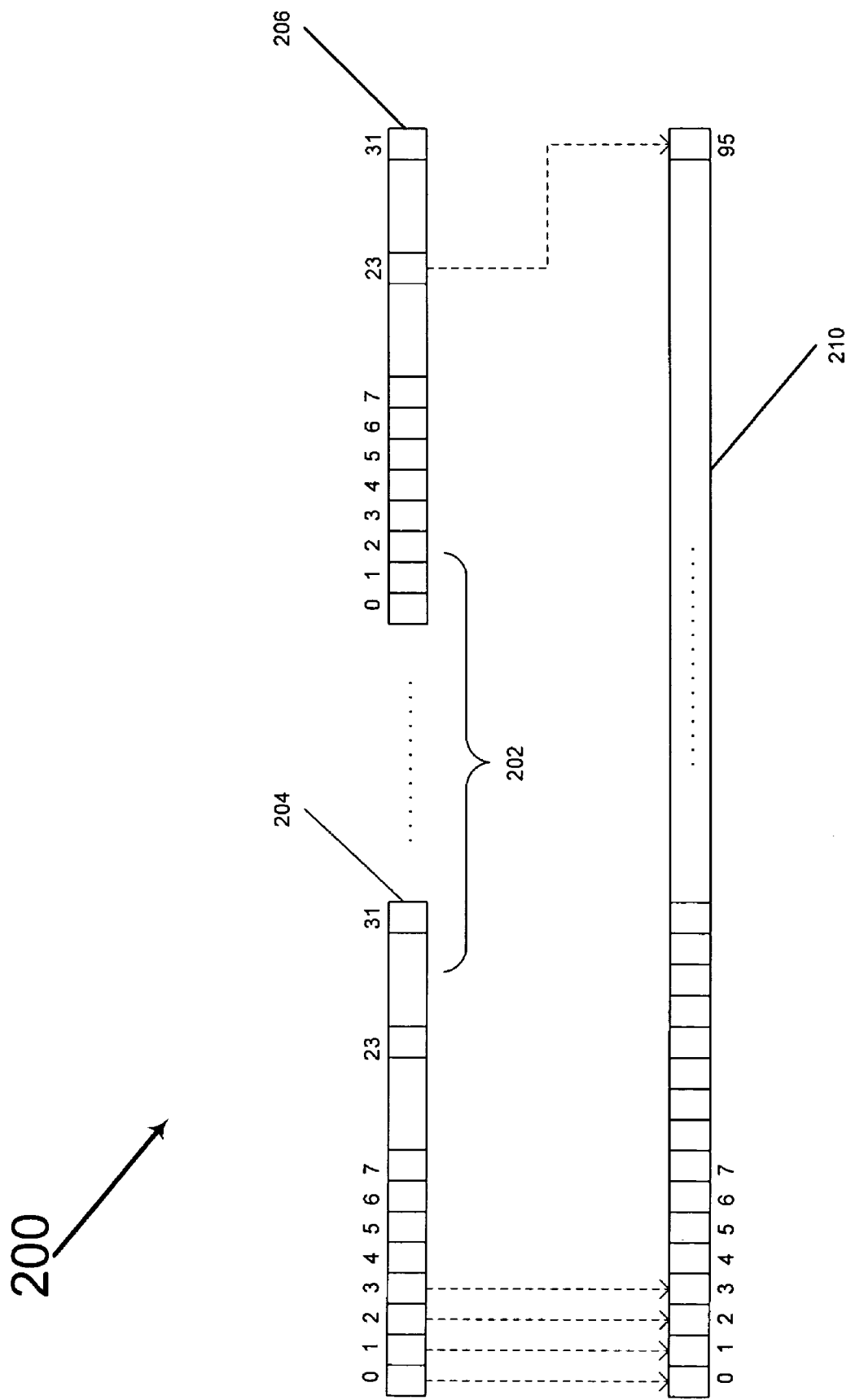
FIG. 2 illustrates an embodiment of the present invention comprising a bit-mask-array and a bit-mask comprising a plurality of bit-mask-segments.

FIG. 2 illustrates an embodiment of the present invention 200 comprising a multi-word bit-mask and a bit-mask-array 210 useful for scheduling 96 interfaces. The multi-word bit-mask comprises a bit-mask-level-1 202, which comprises four bit-mask-segments, each bit-mask-segment having 24 bits. The bit-mask-segments of FIG. 2 are implemented as 32-bit words, each having 24 usable bits. Two of the 32-bit words (204 and 206) are shown in FIG. 2. The other two 32-bit words are not shown in FIG. 2. The 32-bit words can be integer-type words, for example, as described in FIG. 1 and its accompanying text. Collectively, the bit-mask-level-1 in FIG. 2 contains 96 bits with each of the 96 bits being associated with one of the 96 elements of the bit-mask-array 210 as indicated by the dashed arrows in FIG. 2. That is, bit 0 of the first bit-mask-segment 204 is associated with element 0 of the bit-mask-array 210, bit 1 of the first bit-mask-segment 204 is associated with element 1 of the bit-mask-array 210, and so on, with bit 23 of the fourth bit-mask-segment 206 associated with element 95 of the bit-mask-array 210. Each element of the bit-mask-array 210 is associated with an interface and contains an interface-class identifier similarly to the bit-mask-array 110 of FIG. 1.

Interface scheduling according to the present invention operates on the bit-mask of FIG. 2 in a similar manner as the bit-mask of FIG. 1. Bit-mask-segments can be implemented as 32-bit words, for example, just as the bit-mask-level-1 102 of FIG. 1 is implemented. Preferably, each bit-mask-segment of the bit-mask-level-1 202 in FIG. 2 is operated on in the same manner as is explained above in conjunction with the bit-mask-level-1 102 of FIG. 1. However, once all the bits in the first bit-mask-segment 204 have been checked, and the appropriate interfaces serviced, the interface scheduling will start on the first bit of the second bit-mask-segment (not shown). The second bit-mask-segment (not shown) is then handled in the same manner as the first bit-mask-segment 204, the third bit-mask-segment (not shown) is then handled in the same manner as the second bit-mask-segment (not shown), and the fourth bit-mask-segment 206 is then handled in the same manner as the third bit-mask-segment (not shown). Once the fourth bit-mask-segment 206 is handled, the interface scheduling can begin again with the first bit-mask-segment 204.

Figure 3:
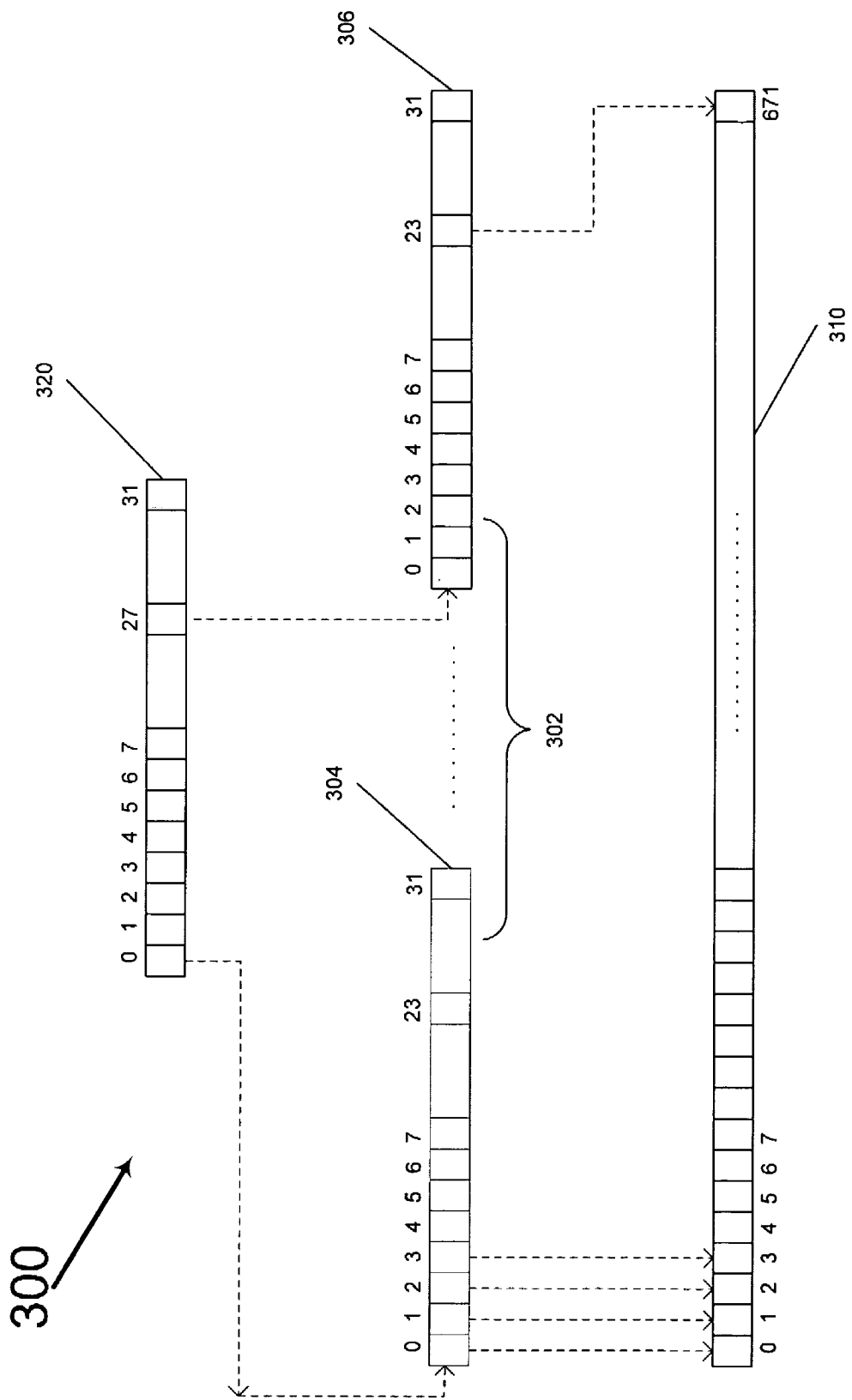
FIG. 3 illustrates an embodiment of the present invention comprising a bit-mask-array and a multi-level bit-mask comprising a bit-mask-level-1 and a bit-mask-upper-level.

FIG. 3 illustrates an embodiment of the present invention 300 comprising a multi-level bit-mask and a bit-mask-array 310 useful for scheduling 672 interfaces. The multi-level bit-mask comprises a bit-mask-level-1 302 and a bit-mask-upper-level 320. The bit-mask-level-1 302 of FIG. 3 is similar to the bit-mask-level-1 202 of FIG. 2 in that it comprises a plurality of bit-mask-segments with each bit-mask-segment implemented as a 32-bit word. However, the bit-mask-level-1 302 of FIG. 3 is significantly larger than the bit-mask-level-1 202 of FIG. 2. The bit-mask-level-1 302 of FIG. 3 comprises twenty-eight bit-mask-segments with each bit-mask-segment in the bit-mask-level-1 302 of FIG. 3 having 24 bits. The first bit-mask-segment 304 and the last (that is, the twenty-eighth) bit-mask-segment 306 are shown in FIG. 3. The other bit-mask-segments are not shown in FIG. 3. The bit-mask-segments can be integer-type words, for example, as explained in FIGS. 1 and 2 and accompanying text. Collectively, the bit-mask-level-1 302 in FIG. 3 contains 672 bits with each of the 672 bits being associated with one of the 672 elements of the bit-mask-array 310 as indicated by the dashed arrows in FIG. 3. That is, bit 0 of the first bit-mask-segment 304 is associated with element 0 of the bit-mask-array 310, bit 1 of the first bit-mask-segment 304 is associated with element 1 of the bit-mask-array 310, and so on, with bit 23 of the last bit-mask-segment 306 associated with element 671 of the bit-mask-array 310. Each element of the bit-mask-array 310 is associated with an interface and contains an interface-class identifier similarly to the bit-mask-array 110 of FIG. 1 and the bit-mask-array 210 of FIG. 2.

The multi-level bit-mask of FIG. 3 comprises a bit-mask-upper-level 320. The bit-mask-upper-level 320 comprises a single bit-mask-segment. Each bit in the bit-mask-upper-level 320 is associated with a bit-mask-segment in the bit-mask-level-1 302. For example, the first bit (that is, bit 0) of the bit-mask-upper-level 320 is associated with the first bit-mask-segment 304 of the bit mask-level-1 302, the second bit (that is, bit 1) of the bit-mask-upper-level 320 is associated with the second bit-mask-segment (not shown) of the bit-mask-level-1 302, and so on, with the last bit (that is, bit 27) of the bit-mask-upper-level 320 being associated with the last bit-mask-segment 306 of the bit-mask-level-1 302. Whenever any of the bits in a bit-mask-segment comprising the bit-mask-level-1 302 of FIG. 3 are set, the corresponding bit in the bit-mask-upper-level 320 is also set. For example, if any of the bits (that is, bit 0-bit 23) in the first bit-mask-segment 304 is set, then bit 0 of the bit-mask-upper-level 320 will be set. If all of the bits in the first bit-mask-segment 304 become cleared, then bit 0 of the bit-mask-upper-level 320 will be cleared. Similarly, if any of the bits (that is, bit 0-bit 23) of the last bit-mask-segment 306 are set, then bit 27 of the bit-mask-upper-level 320 will be set. If all of the bits in the last bit-mask-segment 306 become cleared, then bit 27 of the bit-mask-upper-level 320 will be cleared. This example uses two levels in the bit-mask, bit-mask-level-1 302 and bit-mask-upper-level 320.

For higher speed lines it is possible to extend this design to multiple level bit masks where the number of levels is greater than 2. For example, a three-level bit-mask may be utilized, having multiple bit-mask-segments in the bit-mask-upper-level of level 2. Each bit in the bit-mask-upper-level of level 3 would be associated with a bit-mask-segment in the bit-mask-upper-level of level 2. And each bit in the bit-mask-upper-level of level two would be associated with an element in a bit-mask-array.

Interface scheduling according to the present invention operates on the bit-mask of FIG. 3. Thus, the scheduling logic operates on the bit-mask-upper-level 320 and the bit-mask-level-1 302 of FIG. 3. The bit-mask-upper-level 320 can be advantageously used to prevent searching the bits of bit-mask-segments that have all their bits cleared. The bit-mask-segments of the bit-mask 302 are all implemented as 32-bit words. Preferably, scheduling logic of the present invention will start at one end of the bit-mask-upper-level 320 and look for the next set bit. A set bit in the bit-mask-upper-level 320 indicates that there are one or more bits set in the corresponding bit-mask-segment of the bit-mask-level-1 302. For example, if the scheduling logic starts at bit 0 and bit 2 is the first set bit in the bit-mask-upper-level 320, then all the bits in first bit-mask-segment 304 of the bit-mask-level-1 302 and all the bits in the second bit-mask-segment (not shown) of the bit-mask-level-1 302 will all be cleared, indicating that none of the interfaces associated with those bits in the first bit-mask-segment 304 and the second bit-mask-segment (not shown) need servicing. When the scheduling logic notices that bit 2 of the bit-mask-upper-level 320 is set, the scheduling logic will operate on the corresponding bit-mask-segment of the bit-mask-level-1 302 in a manner similar to the handling of a bit-mask-segment in the bit-mask-level-1 202 of FIG. 2. When the appropriate interfaces corresponding to set bits in the corresponding bit-mask-segment have been serviced, then the interface scheduling will resume searching for the next set bit in the bit-mask-upper-level 320, starting with bit 3. Prior to resuming at bit 3, the scheduling logic will check to see if all bits in the just finished bit-mask-segment corresponding to bit 2 are cleared. If all those bits are cleared, then bit 2 in the bit-mask-upper-level 320 will be cleared prior to resuming the interface scheduling at bit 3. Once all the bits in the bit-mask-upper-level 320 have been checked and appropriate interfaces serviced, the scheduling logic can start over with the first bit (that is, bit 0 in the above example) of the bit-mask-upper-level 320.

Preferably, the bit-mask and bit-mask-array are created during initialization of a communication device embodying the present invention. The number of bits in the bit-mask-level-1 is calculated based on the physical port'sline-speed and the lowest unit of bandwidth, before any interfaces on that physical port are instantiated. All bits in the bit-mask are cleared at initialization time. When interfaces are instantiated, the number of bits required to represent each interface in the bit-mask is determined based on the interface bandwidths. The locations of the bits in the bit-mask-level-1 corresponding to each interface are determined and the appropriate interface-class identifiers are placed in the corresponding elements in the bit-mask-array. The locations of the bits in any bit-mask-upper-level, if present, corresponding to each bit-mask-segment are determined.

Embodiments of the present invention may advantageously utilize multiple bit-masks for Traffic Shaping. For example, embodiments of the present invention can use two bit-masks to implement variations of the dual-token-bucket algorithm. The dual-token-bucket algorithm is known in the art and will not be explained in detail herein, but aspects of the algorithm may be reviewed here. As is known in the art, a dual-token-bucket algorithm uses two different data transmission rates. The lower of the two transmission rates is typically referred to as the Committed Information Rate ("CIR"), but may also be referred to as the Sustainable Bit Rate ("SBR"), for example. The higher of the two transmission rates is typically referred to as the Excess Information Rate ("EIR"), but may also be referred to as the Peak Information Rate ("PIR") or the Peak Bit Rate ("PBR"), for example. Generally, the dual-token-bucket algorithm classifies data units (for example, packets) as either non-conforming, CIR, or EIR. If a data unit cannot be transmitted at the higher rate (that is, EIR), then the data unit is considered non-conforming and is discarded or dropped. If the data unit can be transmitted at the lower rate (that is, CIR), then the data unit is classified as CIR. If the data unit can not be transmitted using the CIR but can be transmitted using the EIR, then the data unit is classified as EIR.

In one embodiment of the present invention, values for CIR and EIR are determined. The specific values of CIR and EIR are not critical to the present invention and may vary in different implementations. Two bit-masks (each bit-mask may have multiple levels) are created—the first bit-mask corresponds to the CIR bucket of the dual-token-bucket algorithm ("CIR-bit-mask") and the second bit-mask corresponds to the EIR bucket of the dual-token-bucket algorithm ("EIR-bit-mask"). The number and position of bits that are associated with each interface are identical in both bit-masks.

The scheduling logic operates on the two bit-masks. To identify the next interface to service, the next set bit in both the bit-mask-level-1 of the CIR-bit-mask and the bit-mask-level-1 of the EIR-bit-mask is identified. Next, the scheduling logic determines which of the set bits is closer to the current bit. For example, if the scheduling logic has finished looking at bit 3 and serviced any appropriate interfaces, then bit 3 is the current bit. If the next set bit in the bit-mask-level-1 of the CIR-bit-mask is bit 5 and the next set bit in the bit-mask-level-1 of the EIR-bit-mask is 7, then the set bit (that is, bit 5) in the bit-mask-level-1 of the CIR-bit-mask is referred to herein as being closer to the current bit.

If the CIR-bit-mask bit is the closer bit, then the CIR-bit-mask is used to identify the next interface to be serviced, de-queuing data units from that interface until either the interface becomes empty or the time unit for that interface expires. If the time unit for servicing a bit in the bit mask expires before the interface becomes empty, then the scheduling logic continues scanning the CIR-bit-mask and EIR-bit-mask to determine the next interface to be serviced. On the other hand, if the interface becomes empty, then all bits corresponding to that interface are cleared in the bit-mask-level-1 of the CIR-bit-mask, indicating the interface is empty. If there is still time for that interface remaining, then the equivalent bit in the bit-mask-level-1 of the EIR-bit-mask is checked. If the equivalent bit in the bit-mask-level-1 of the EIR-bit-mask is set, then the interface continues to be serviced.

Figure 4:
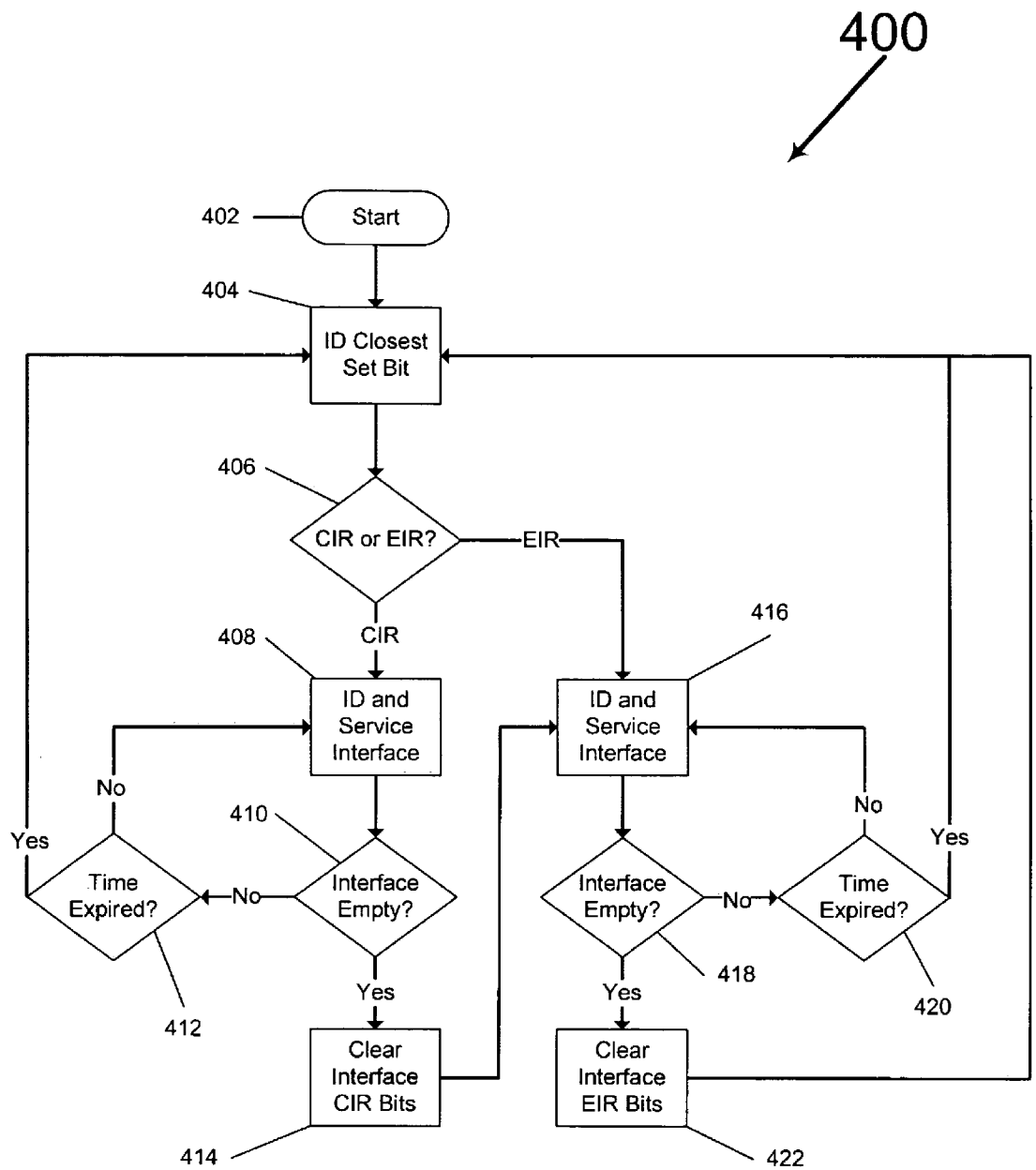
FIG. 4 shows a flowchart illustrating an interface scheduling method in accordance with the present invention.

If the EIR-bit-mask bit is the closer bit, then the EIR-bit-mask is used to identify the next interface to be serviced, de-queuing data units from that interface until either the interface becomes empty or the time unit for that interface expires. The bit corresponding to the just serviced interface becomes the current bit. If the time unit for that interface expires before the interface becomes empty, then the scheduling logic continues scanning the CIR-bit-mask and EIR-bit-mask to determine the next interface to be serviced. If the interface becomes empty as a result of servicing the interface, then all bits corresponding to that interface are cleared in the bit-mask-level-1 of the EIR-bit-mask and the scheduling logic resumes by determining the closest set bit in either the bit-mask-level-1 of the CIR-bit-mask or the bit-mask-level-1 of the EIR-bit-mask FIG. 4 shows a flowchart illustrating an interface scheduling method in accordance with the present invention. Step 402 is the start of the scheduling. Any initializations that need to be performed can be performed in step 402. When step 402 is completed, all bit-masks, bit-mask-arrays, and data structures, for example, will have been created. Also, any computer programming variables will be set to initial values, such as a variable indicating the value of the current bit. In step 404, the scheduling logic identifies the set bit in a bit-mask-level-1 that is closest to the current bit. In step 406, the scheduling logic determines whether the closest set bit is in the CIR-bit-mask or whether the closest set bit is in the EIR-bit-mask. If the closest set bit is in the CIR-bit-mask, then the scheduling logic proceeds to step 408 and if the closest set bit is in the EIR-bit-mask, the scheduling logic proceeds to step 416. In step 408, the closest set bit becomes the current bit and the scheduling logic uses that bit in the CIR-bit-mask to identify and service the next interface by de-queuing data units until either the interface is empty or the time unit for that interface has expired. Upon completion of step 408, the scheduling logic proceeds to step 410, wherein the scheduling logic determines whether the interface is empty. If the interface is empty, the scheduling logic proceed to step 412 and if the interface is not empty the scheduling logic proceeds to step 414. In step 412, the scheduling logic determines whether the interface's time unit has expired. If the interface's time unit has expired, then the scheduling logic returns to step 404 and if the interface's time unit has not expired the scheduling logic returns to step 408. If the interface is empty, then servicing the interface is completed and the scheduling logic proceeds step 414. In step 414, the scheduling logic clears all the bits in the CIR-bit-mask corresponding to the serviced interface, clearing the corresponding bit in any bit-mask-upper-level if all bits in a corresponding bit-mask-segment are cleared. After clearing the bit(s) in the CIR-bit-mask, the scheduling logic proceeds to step 416, wherein the interface corresponding to the current bit is serviced by de-queuing data units until either the interface is empty or the time unit for that interface has expired. After step 416 is completed, that scheduling logic proceeds to step 418, wherein the scheduling logic checks to see if the serviced interface is empty. If the interface is not empty, the scheduling logic proceeds to step 420, wherein the scheduling logic checks to see if the interface's time unit has expired. If the interface's time unit has expired, the scheduling logic returns to step 404 and if the interface's time unit has not expired, the scheduling logic returns to step 416. If the interface is empty, the scheduling logic proceeds to step 422, wherein the scheduling logic clears all the bits in the bit-mask-level-1 of the EIR-bit-mask corresponding to the serviced interface, clearing the corresponding bit in any bit-mask-upper-level if all bits in a corresponding bit-mask-upper-level have become cleared. Upon completion of step 422, the scheduling logic proceeds back to step 404.

In accordance with the present invention, systems and methods embodying novel interface scheduling and traffic-shaping have been provided. The interface scheduling and traffic-shaping can be implemented to schedule large numbers of interfaces efficiently. While the present invention has been shown and described herein with reference to specific embodiments thereof, it should be understood by those skilled in the art that variations, alterations, changes in form and detail, and equivalents may be made or conceived of without departing from the spirit and scope of the invention. Accordingly, the scope of the present invention should be assessed as that of the appended claims and by equivalents thereto.

What is claimed is:

1. A system for scheduling interfaces, the system comprising:
    a port having a line speed, the port being a physical port;
    a plurality of interfaces associated with the port, each interface having a bandwidth, each interface using the port to transmit data units according to a schedule;
    a first bit-mask associated with the port, the first bit-mask comprising a first bit-mask-level-1 having a plurality of bits, each bit in the first bit-mask-level-1 representing a unit of bandwidth with a total number of bits in the first bit-mask-level-1 representing the port's line speed, each bit in the first bit-mask-level-1 associated with an interface, each interface being associated with one or more bits in the first bit-mask-level-1, and the number of bits associated with each interface determining the bandwidth for that interface;
    a second bit-mask associated with the port, the second bit-mask comprising a second bit-mask-level-1 having a plurality of bits separately addressable from those of the first bit mask, each bit in the second bit-mask-level-1 representing a unit of bandwidth with the total number of bits in the second bit-mask-level-1 representing the port's line speed, each bit in the second bit-mask-level-1 associated with the interface, and the number of bits in the second bit-mask-level-1 associated with each interface determining the bandwidth for that interface; and
    operable logic that uses the first bit-mask and the second bit-mask to identify an order in which the interfaces are scheduled for transmitting data units via the port.

2. The system according to claim 1, wherein the first and second bit-masks are each associated with a transmission rate for the interfaces.

3. The system according to claim 2, wherein the first bit-mask is associated with committed information rates for the interfaces and the second bit-mask is associated with excess information rates for the interfaces.

4. The system according to claim 3, wherein the operable logic is adapted to execute a version of the dual token bucket algorithm.

5. The computer-implemented method of claim 1, further comprising:
    a bit-mask-array, wherein the bit-mask-level-1 comprises a plurality of bit-mask segments;
    wherein the bit-mask further comprises a bit-mask-upper-level having a plurality of bits, each bit in the bit-mask-upper-level being associated with a bit-mask-segment, wherein the bit-mask-upper-level comprises a plurality of bit-mask-segments.

6. A computer-implemented method of scheduling interfaces over a physical port, the computer-implemented comprising:
    associating a first bit-mask with the physical port, the first bit-mask comprising a first bit-mask-level-1 having a plurality of bits, the physical port having a line speed, wherein each bit in the first bit-mask-level-1 represents a unit of bandwidth with a total number of bits in the first bit-mask-level-1 representing the physical port's line speed;
    associating a second bit-mask with the physical port, the second bit-mask comprising a second bit-mask-level-1 having a plurality of bits separately addressable from those of the first bit mask wherein each bit in the second bit-mask-level-1 represents a unit of bandwidth with a total number of bits in the second bit-mask-level-1 representing the physical port's line speed;
    associating each bit in the first bit-mask-level-1 with an interface from a plurality of interfaces associated with the physical port, each interface being associated with one or more bits in the first bit-mask-level-1, wherein the number of bits in the first bit-mask-level-1 associated with each interface determines a bandwidth for that interface;
    associating each bit in the second bit-mask-level-1 with the interface from the plurality of interfaces, wherein the number of bits in the second bit-mask-level-1 associated with each interface determines a bandwidth for that interface; and
    determining an order, in which interfaces are scheduled for transmitting data units, from the first bit-mask and second bit-mask.

7. The computer-implemented method according to claim 6, wherein determining an order includes checking the bits in one, or both, of the first bit-mask-level-1 and second bit-mask-level-1 sequentially to identify the next interface scheduled.

8. The computer-implemented method according to claim 7, further comprising associating the first and second bit-masks with transmission rates for the interfaces.

9. The computer-implemented method according to claim 8, further comprising associating the first bit-mask with committed information rates for the interfaces; and associating the second bit-mask with excess information rates for the interfaces.

10. The computer-implemented method according to claim 9, wherein determining an order includes performing a dual token bucket algorithm.

11. The computer-implemented method of claim 6, further comprising:
creating the first bit-mask and a bit-mask-array during initialization of a network communication device, the first bit-mask being a multi-level bit-mask wherein bits in an upper level of the first bit-mask are associated with bit-mask segments of a lower level of the first bit-mask, the first bit-mask comprising a bit-mask-level-1 having a number of bits, the number of bits in the bit-mask-level-1 being calculated based on line speed of the physical port and a lowest unit of bandwidth of the physical port, the first bit-mask comprising a bit-mask-upper-level in addition to the bit-mask-level-1, the bit-mask-level-1 comprising a plurality of bit-mask segments with each bit-mask segment indicated as a bit word of a predetermined length, each bit being associated with one of multiple elements of the bit-mask-array, each element of the bit-mask-array being associated with an interface and containing an interface-class identifier, the bit-mask-upper-level comprising a single bit-mask segment.

12. A computer-implemented method of scheduling interfaces for transmitting data through a physical port, the computer-implemented comprising:
programming a network communication device to execute the steps of:
creating a bit-mask and bit-mask-array during initialization of the network communication device, the bit-mask being a multi-level bit-mask wherein bits in an upper level of the bit-mask are associated with bit-mask segments of a lower level, the bit-mask comprising a bit-mask-level-1 having a number of bits, the number of bits in the bit-mask-level-1 being calculated based on line speed of the physical port and a lowest unit of bandwidth of the physical port, the bit-mask comprising a bit-mask-upper-level in addition to the bit-mask-level-1;
associating the bit-mask with the physical port, wherein each bit in the bit-mask-level-1 represents a unit of bandwidth with a total number of bits in the bit-mask-level-1 representing the physical port's line speed, the bit-mask-level-1 comprising a plurality of bit-mask segments with each bit-mask segment indicated as a bit word of a predetermined length, each bit being associated with one of multiple elements of the bit-mask-array, each element of the bit-mask-array being associated with an interface and containing an interface-class identifier, the bit-mask-upper-level comprising a single bit-mask segment, wherein each bit in the bit-mask-upper-level is associated with a bit-mask segment in the bit-mask-level-1
associating each bit in the bit-mask-level-1 with an interface from a plurality of interfaces associated with the physical port, each interface being associated with one or more bits in the bit-mask-level-1, wherein the number of bits in the bit-mask-level-1 associated with each interface determines a bandwidth for each interface;
in response to setting a given bit in a given bit-mask segment of bit-mask-level-1, setting a corresponding bit in the bit-mask-upper-level; and
determining an order, in which interfaces are scheduled for transmitting data units via the physical port, using the bit-mask-level-1 and bit-mask-upper-level.

13. The computer-implemented method of claim 12, further comprising using the bit-mask-upper-level to prevent searching bit-mask segments that have all bits cleared.

* * * * *